United States Patent Office 3,548,181
Patented Dec. 15, 1970

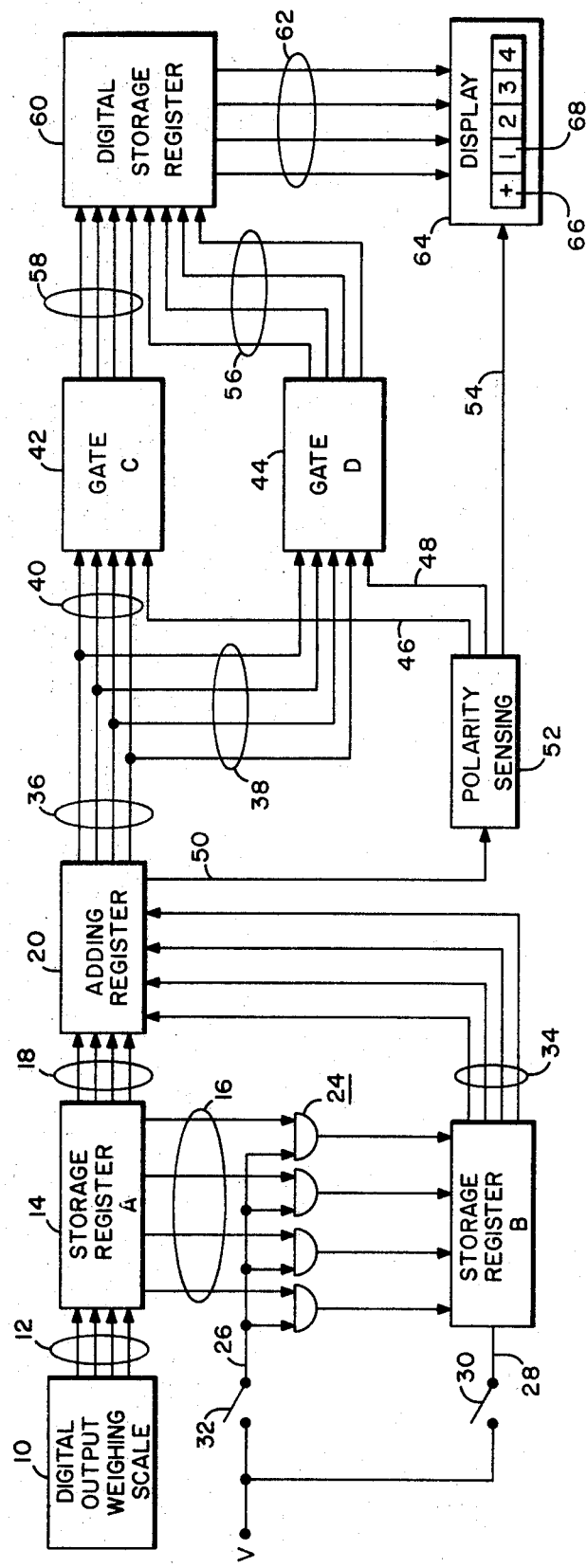

3,548,181
WEIGHING IN AND WEIGHING OUT SCALES INDICATING APPARATUS AND METHOD
Ernest W. Fischer, Jr., 1431 Cascade Place 92021, and Robert J. Price, 1311 Hacienda Drive 92020, both of El Cajon, Calif.
Filed Oct. 2, 1967, Ser. No. 672,367
Int. Cl. G06f 15/20
U.S. Cl. 235—168          4 Claims

ABSTRACT OF THE DISCLOSURE

The method and apparatus for displaying the weight of objects moved onto and out of a carrying means, platform or the like that is weighed by digital output scales providing a series of digital signals giving the weight of the objects and carrying means. The apparatus is selectively set at a zero weight indication display for a given total weight of the objects and carrying means so that only an addition or reduction in weight of the objects weighed is displayed as a plus or minus up scale reading on the digital display.

SUMMARY OF THE INVENTION

There are several system and apparatus arrangements for weighing articles or fluids carried in containers or lifted by lifting devices such as cranes using electric magnets or the like. An example of such a crane structure and scales arrangement is illustrated in U.S. Pat. No. 3,339,652. These lifting devices normally lift loads of different sizes and move these loads to other locations where the loads are deposited either totally or in partial amounts. The weighing scales weigh the entire load including the grab container or the like that supports the load. Thus in reading the output of the weigh scale. the operator must calculate the load by subtracting the weight of the container, grab or the like. Still further, as for example, where the load carrying device is a container that contains a large quantity of liquid to be dispensed in a plurality of containers, the operator must subtract a given amount of fluid deposited in each separate container in order to dispense an accurate amount of weight of material to each container. This requires that difficult mathematical computations be continuously made to keep track of the weight of dispensed materials during the operation of dispensing the material or fluid. Such continuous calculations can lead to errors being made in the weight of dispensed materials and reduces the speed of accurately and quickly dispensing the fluids or materials.

So it would be advantageous to have a display means that displays weight scales reading in a manner that the weight added to or subtracted from a given load is read directly as an up scale reading.

SCOPE OF THE INVENTION

An embodiment of our invention comprises a method and apparatus for displaying the weight of objects carried by a carrying means of any suitable type, design and construction, that is weighed by any kind of known digital output scales, and to particularly display up scale readings from a zero point with positive or negative indications, the weight of objects moved into or out of the carrying means. The invention is particularly used with digital output scales that provide a series of digital signals on either a periodic or substantially continuous basis that reflect the weight of the objects and the carrying means.

The embodiment has a first storage register means that receives the plurality of digital signals from the scales representing the weight of the objects and the carrying means. The first storage means provides first digital output signals reflecting the aforesaid weights and second digital output signals that are the complement of the first digital output signals. A plurality of gates, gate the complement output. Switch means selectively control the gates to apply, upon command, the digital complement output to the second storage register means. An adding register adds the digital output signals and the digital complement output of the second storage register means and provides a sum digital output signal.

The digital complement output signal is placed in the second storage register to cancel out the first digital output signals and thus provide a zero reading on the display for a given load weight. This complement signal, which for example may be the 9's complement, is held in the second storage register as long as desired and functions to cause the display to read only changes in the weight on the scales after the complement signal was gated to the second storage register. When weight is added to the load weighed, the first digital output signals are increased while the complement output signal in the second storage register remains the same until it is changed. Thus any increase in the load weight causes a new significant digit to be added to the digital number in the adding register and any decrease in the load weight does not cause a new significant digit. This new significant digit in the adding register is called a carry digital signal and occurs when there is a positive up scale readout rather than a negative up scale readout.

A pair of gates that are selectively operable by a polarity sensing means, passes the sum digital output from the adding register to a digital storage register. The digital storage register stores the digital information received and applies it to a digital display that displays the numerical value of the digital information. The polarity sensing means senses whether there is a carry digital signal in the adding register, and when there is, gates one of the pair of gates. This applies the output of the adding register to a portion of the digital storage register that registers the true number of the digital signal received. When there is no carry signal in the adding register, then the polarity sensing means energizes the second gate that passes the output of the adding register to the digital storage register that registers the complement of the digital signal received. Accordingly the display means either displays the complement of the output of the adding register or the true value of the output of the adding register depending upon which gate is selected by the polarity sensing means. Since the readout in each case is up scale, the polarity sensing means causes the display means to display a positive or negative signal to indicate an increase or decrease in load weight.

Thus it may be understood that the scales indicating apparatus provides up scale direct readings of both increases and decreases in weight without requiring the operator or an additional sensing device to calculate the change or to provide information as to whether the change in weight is an increase or decrease. Thus the automatic display, upon demand, shows zero for any given load weight and then reads any subsequent change of weight that is added to or subtracted from the load weight weighed by the scale.

Thus it is an object of this invention to provide a new and improved weighing in and weighing out scales indicating apparatus and method.

It is another object of this invention to provide a new and improved weighing in and weighing out scale indicator and method that selectively and instantaneously sets the displayed load weight reading to zero.

It is another object of this invention to provide a new and improved weighing in and weighing out scale indicator and method that provides an up scale display of increases or decreases in load weight with an indication as to whether the change in load weight is an increase or decrease.

It is another object of this invention to provide a new and improved scale indicator that may be selectively reset to a zero reading upon command.

Other objects and many advantages of this invention will become more apparent upon a reading of the following detailed specification and an examination of the drawing in which like reference characters designate like parts throughout.

Referring to the drawing, a digital output weighing scale 10 of any suitable design or type is used for weighing a load carried by a device such as a crane, conveyor or the like, and provides digital output signals corresponding to the analogue number of the weight of the load. Usually the load weight includes the container, electromagnetic device or the like that supports the material being lifted and can, depending upon the installation, include part of the lifting mechanism. The digital output weighing scale provides a digital input through lines 12 to a first storage register 14. The number of lines 12 are representative only, as there are sufficient lines to carry digital information for four separate digits. Thus each of the illustrated lines 12 corresponds to a single digit and would comprise a suitable number of lines such as four lines. Should the number of digits be increased or decreased, then the number of lines would be changed. For example, the four lines for each digit can have a code factor of 1–2–2–4.

The input digital information for the load weight of the carrying means and the objects carried is received and stored in the storage register A and is passed as a digital output signal through lines 18 to an adding register 20. Also the digital output signal in storage register A is fed through lines 16 and through a plurality of gates 24 to the second storage register B where it is stored as the complement of the digital output. This complement may be the 9's complement of the digital output signal. The gates 24 will be in sufficient number to gate the lines 16. An input signal through line 26 is applied, when switch 32 is closed to the individual gates 24, gating the signal from storage register A to storage register B. A signal through line 28 and switch 30 clears storage register B to the 9's complement of zero, which for a four digit analogue number is 9999. The complement output of the storage register B is fed through lines 34 to the adding register 20. The adding register 20 adds the sum of the true digital output signal received from the storage register A and the complement digital signal stored in storage register B and applies this digital information through lines 36, 38 and 40 through gates 42 and 44 and through lines 56 and 58 to the digital storage register 60. The digital storage register 60 stores the digital number received through gate C or gate D and applies the digital information to the display 64 that displays the digital signals in the number display 68.

When the sum of the digital signals received by the adding register is larger than four numbers, such as in this embodiment a number larger than 9999, the additional most significant digit is added as a carry signal by the adding register to the least significant digit of the number. The adding register also provides an output signal to the polarity sensing means 52 when there is a carry signal. The polarity sensing device 52, which is a flip flop circuit that is responsive to a carry pulse in the adding register, provides output signals to either of lines 46 and 48 depending upon whether it has received a carry signal from the adding register through line 50. When no carry signal is received, then the polarity sensing means energizes gate D. When a carry signal has been received, then a gating signal is applied by the polarity sensing means through lines 46 to gate C. Line 54 feeds a plus or minus signal to display 64.

If the digital output signals from adding register 20 has five digits, then the polarity sensing means 52 gates gate C and the true digital signal for the load weight is gated to the digital storage register 60 and this true digital number is fed to the digital display 64. When the digital output signal from adding register 20 has four digits, then the polarity sensing means 52 gates gate D and the digital signal for the load weight is stored by the digital storage register 60 as the 9's complement of the digital signal. This complement digital signal is displayed by display 64.

In operation, the digital output weighing scale 10 weighs the load weight and provides a digital output signal through lines 12 to the first storage register 14 or storage register A. For purposes of explanation, this weight is assumed to be the digital number for an analogue weight number of 1,234 pounds. Prior to this time the storage register B has been cleared by momentarily closing switch 30. Accordingly, the output of the storage register B is the complement of zero or a digital output signal of 9999. Since switch 32 is open there is no signal applied to line 26 and gates 24 are closed and no input signal is received by storage register B from storage register A.

The adding register adds the digital output signals from storage register A and storage register B, which total is 11,233. However, the output lines 36 only carry a four digit number. Thus the adding register 20 generates a carry pulse in the manner well known in the art and adds the most significant digit to the least significant digit of the number. Thus the number output from the adding register is 1234. This number is the weight of the load weighed by the digital output weighing scale 10. The polarity sensing device 52 responds to the carry pulse condition in the adding register 20 and through its flip flop circuit energizes gate C, gating the true number digital output to the digital storage register 60. The digital storage register 60 applies the true signal through lines 62 to the display device 64 that displays the weight as 1,234 pounds. Also the polarity sensing device having sensed a carry signal provides an output pulse through line 54 to the display device 64 that causes a plus sign 66 to be illustrated in display 68. The storage register 60 will continue to store this digital signal until a difference digital signal is received from either gate C or gate D. Thus in the initial condition, the display device 64 displays the analogue weight number for the actual or true digital weight being weighed by the digital output weighing scale 10.

One of the purposes of the invention is to start with an initial load weight of, for example 1,234 pounds and to clear this weight on the display 64 to a zero weight display. Then additions to or removal from the load weight is displayed as an up scale readout by the digital display 64. In accomplishing this, switch 30 is momentarily closed clearing storage register B and then switch 32 is closed applying an input signal through line 26 that opens gates 24 and passes the digital output of storage register A through lines 16 to storage register B as the 9's complement of the number 1,234. Thus the number 8,765 is stored in storage register B and this output complement number is applied through lines 34 to the adding register 20. The adding register 20 adds the digital information of numbers 1,234 and 8,765 and provides a digital output signal having an analogue number of 9,999. Since there are only four numbers in the digital output of the adding register 20, the polarity sensing device 52 does not sense a carry pulse and thus an output signal is applied through line 48 gating gate D and passing the output of the adding register 20 through lines 56 to the complement input of the digital storage register 60. The complement of the digital number 9999 is 0000. This zero signal, stored by the digital storage register 60, is applied through lines 62 to display a 0000 on display 64. Also the polarity sensing means 52 sends a signal through line 54 to the digital display 64 that causes a minus sign to be displayed in window 66. Accordingly, while the digital output of the digital output weighing scale is 1,234, the display device 64 has been cleared to a zero reading for this load weight.

The complement digital sinal stored in storage register B is held until it is changed in the manner previously described by actuating switches 30 and 32 in sequence.

Now assuming that the lead weight increases by 1,111 pounds to a weight of 2345. This digital signal of 2345 is applied to storage register A through lines 12 and through lines 18 to the adding register 20. The complement signal of 8765 is applied through lines 34 to the adding register 20. The two signals are added together arithmetically in the adding register 20 to provide a digital output number of 11,110 in the lines 36. Since this is a four digit system, it is well known that the adding register generates a carry pulse as a result of the five number addition. The most significant digit which is a 1 becomes the carry pulse that is carried over to the least significant digit providing a digital output signal corresponding to an output number in lines 36 of 1111. Also the carry pulse energizes the flip-flop in the polarity sensing device 52 that provides an output pulse in line 46 gating gate C. Gate 42 thus gates the digital number of 1111 through lines 40 and 58 to the digital storage register 60. The polarity sensing device also provides an output signal through line 54 giving a positive sign in window 66. Thus the display device 64 displays a positive 1111 for the increase in load weight of 1,111 pounds.

All registers except storage register B are reset with each subsequent digital signal output pulse from the digital output weighing scale 10. Thus assuming that a certain amount of weight, for example, 1,111 pounds, is removed from the load weight, then the digital output signal from the digital output weighing scale 10 is 0123 or a decrease in weight of 1,111 pounds. The adding register 20 adds the digital signal of 0123 in lines 18 and the digital signal of 8765 in lines 34, providing an output digital number of 8888 to lines 36 and there is no carry pulse. The polarity sensing means 52 senses no carry pulse and thus energizes gate D gating the digital signal 8888 through lines 56 to the digital complement section of the digital storage register 60. The digital storage register 60 stores and applies to the display 64 through lines 62 the 9's complement of the digital signal 8888 or the number 1111, which is displayed in windows 68. Also the polarity sensing device 52 applies a minus signal through line 54 to the display device 64 which displays a negative sign in window 66. Thus the display device 64 displays a decrease in load weight of 1,111 pounds.

It may be understood that the display device 64 is capable of displaying changes in the load weight being weighed by the digital output weight scale 10 from any starting point. The starting point or zero weight condition may zero the weight of a carrying container, bucket, platform or the like. Then the amount of weight added to or removed from the container is read out in an up scale display with the minus or positive indication showing whether weight displayed is being removed from or added to the object weight in the container. Each time a given amount of weight is removed from the container or platform, then the display can be again returned to zero by merely closing switches 30 and 32 in sequence.

It should be understood that a plurality of storage registers B may be used selectively, upon command, to provide complement digital output signals corresponding to fractions of a given reference load weight. Also such plurality of storage registers B may respond to programmed signals to factor in predetermined complement digital output signals.

It is to be understood that while we have described an embodiment of our invention, various changes and modications can be made therein without departing from the spirit of the invention as expressed in the scope of the appended claims.

Having described our invention, we now claim:

1. The method of displaying the weight of objects moved onto and out of a carrying means, platform or the like that is weighed by digital output scales providing a series of digital signals giving the weight of the objects and carrying means, comprising the steps of:
   providing a first digital output signal of a first object weight weighed by the digital output scales,
   displaying the numerical weight of said first digital output signal in a display,
   providing and storing a first digital complement signal of said first digital output signal,
   adding said first digital complement signal to said first digital output signal and displaying the complement of the sum giving a displayed zero reading,
   providing other digital output signals of other object weights weighed by the digital output scales,
   comparing said other digital output signals with said first digital output signal by adding said other digital output signals individually with said first complement signal,
   and displaying the difference between each of said other digital output signals and said first digital output signal.

2. The method as claimed in claim 1 including the steps of:
   displaying in said display whether each of said other digital output signals are larger or smaller than said first digital output signal.

3. The method as claimed in claim 1 in which said comparing and displaying steps include:
   adding said first digital complement signal with each of said other digital output signals and displaying the sum or difference digital signals as an analogue numerical display of the sum or difference digital signals when the sum or difference has more than a given number of digits and displaying the complement of said sum or difference digital signals when the sum has no more than said given number of digits,
   and indicating on said display whether said sum or difference digital signals have more than said given number of digits.

4. The method as claimed in claim 1 in said step of adding said other digital signals with said first complement signal:
   providing with any increase in load weight reflected in said other digital output signal over said first object weight a new significant digit that is added to the digital number difference between said first digital output and said other digital signal,
   sensing the existence of a new significant digit,
   displaying the weight number of the digital number difference when there exists a new significant digit,
   displaying the complement weight number in the absence of a new significant digit,
   and displaying on said display the existence of a new significant digit.

References Cited

UNITED STATES PATENTS

| | | | |
|---|---|---|---|
| 3,424,898 | 1/1969 | Lukens | 235—174 |
| 3,375,357 | 3/1968 | Dekker et al. | 235—151.33X |
| 2,974,863 | 3/1961 | Williams, Jr., et al. | 235—151.33 |
| 3,166,636 | 1/1965 | Rutland et al. | 235—156X |

MALCOLM A. MORRISON, Primary Examiner

D. H. MALZAHN, Assistant Examiner

U.S. Cl. X.R.

235—151.33